United States Patent
Miyaoka

[11] Patent Number: 5,842,708
[45] Date of Patent: Dec. 1, 1998

[54] DEVICE FOR PREVENTING CART OSCILLATION

[75] Inventor: Norikuni Miyaoka, Tokyo, Japan

[73] Assignee: Japan Tobacco, Inc., Tokyo, Japan

[21] Appl. No.: 704,075

[22] Filed: Aug. 28, 1996

[30] Foreign Application Priority Data

Sep. 1, 1995 [JP] Japan ................. 7-247046

[51] Int. Cl.⁶ ............................................. B60B 33/02
[52] U.S. Cl. ........................... 280/47.35; 280/491.5; 280/410; 16/35 D
[58] Field of Search ................. 16/35 D, 35 R; 280/35, 491.5, 408, 410, 47.34, 47.35

[56] References Cited

U.S. PATENT DOCUMENTS

| | | | |
|---|---|---|---|
| 2,679,283 | 5/1954 | Mahone | 16/35 R |
| 3,751,758 | 8/1973 | Higbee et al. | 16/35 D |
| 4,037,291 | 7/1977 | Huempfner et al. | 16/35 D |
| 4,955,968 | 9/1990 | Beckerer, Jr. | 280/507 |
| 5,074,572 | 12/1991 | Delmerico et al. | 280/79.2 X |
| 5,331,717 | 7/1994 | Joslin et al. | 16/35 R |
| 5,572,005 | 11/1996 | Hamilton et al. | 280/408 X |

FOREIGN PATENT DOCUMENTS

57-181602  11/1982  Japan.
1-175472  12/1989  Japan.

*Primary Examiner*—J. J. Swann
*Assistant Examiner*—Avraham Lerner
*Attorney, Agent, or Firm*—Birch, Stewart, Kolasch & Birch, LLP

[57] ABSTRACT

A device for preventing cart oscillation, wherein the rotation in a horizontal plane of the rear wheel side is controlled by an oscillation controlling member. The rotation in the horizontal place of the rear wheel side is also controlled by a detachable oscillation controlling member having a coupler section for permitting the cart to follow a predetermined course, when a train of a plurality of coupled carts is drawn. As shown in FIG. 5, a device for preventing oscillation for controlling the rotation in a horizontal plane of rear wheels of a cart is detachably fixed to a cart 2 having wheels connected to a wheel support which is rotative in a horizontal plane, in a way to fix the rear wheels by an engagement groove of a slant section 14.

6 Claims, 7 Drawing Sheets

DEVICE FOR PREVENTING CART OSCILLATION

FIELD OF THE INVENTION

The present invention relates to a device for preventing oscillation of an orientatable cart having a bottom including front wheels and rear wheels operatively connected to wheel supports rotative in a horizontal plane.

BACKGROUND OF THE INVENTION

An orientatable cart having a bottom including front wheels and rear wheels operatively connected to wheel supports rotative in a horizontal plane is largely used for article transport or sorting in a factory.

As a device for controlling the oscillation of such a cart, a device described in the Japanese JITSUYOSHINAN-KOKAI-KOHO (18-month Publication of Unexamined Utility Model Application) SHOWA 57(1982)-181602 (hereinafter referred to as JIKKAISHO 57-181602) is well-known.

In this device described in the Japanese JIKKAISHO 57-181602, wheels are connected rotatively in a vertical plane by a wheel support, and the latter is attached rotatively in a horizontal plane to an attachment plate fixed to a cart bottom.

The attachment plate includes an insert hole used for controlling the movement of the wheel support and a similar insert hole is formed in the wheel support.

A detachable bar-shaped body is inserted to the insert hole of the attachment plate and the insert hole of the wheel support. The cart oscillation is controlled by controlling a relative rotation of the attachment plate and the wheel support.

On the other hand, a cart having a structure which may be drawn by linking together a plurality of carts is described, for instance, in the Japanese JITSUYOSHINAN-KOKAI-KOHO HEISEI 1(1989)-175472 (hereinafter referred to as JIKKAIHEI 1-175472).

The cart described in this Japanese JIKKAIHEI 1-175472 includes a wheel support fixed to a bottom of this cart and the wheel support connects to wheels rotatively.

Concretely, respective carts are linked by a coupler and a through hole is formed in the leading cart. A shaft of a traction bar of a tractor may be inserted into this through hole and the cart is movable following the moving direction of the tractor.

As mentioned above, the cart described in the Japanese JIKKAISHO 57-181602 has been improved in respect of the structure of the wheel support and the structure of the attachment plate for controlling the direction changing property. However, if a large number of carts are desired to be improved, it is considerable work to form on the wheel support and the attachment plate insert holes wherein a detachable bar-shaped body is insertable for controlling the cart oscillation.

Moreover, the cart including the wheel support which is rotative in a horizontal plane provides a degree of freedom for defining at will the running direction not only in forward and backward direction but also in a traverse or slantwise direction. Therefore, when a plurality of such carts coupled to each other are drawn, for instance, by a tractor such as an unattended transporter, respective carts will move following the tractor if they are drawn in a straight direction, but, if the tractor moves in a curved path, they can not move along the predetermined curved course.

To be more specific, the respective wheel supports of a cart are freely rotative in a horizontal plane. However, carts drawn by a tractor tend to run straight after entering a curved section, and deviate largely from the moving direction along the curved course of the tractor, which provokes a considerable ocsillation of the carts.

Also, when the cart is running through a straight section, it is possible that cart runs with oscillation causing deviation from the course, if articles on the cart are not loaded equally or are loaded so as to apply load only on a part of the wheels.

Moreover, if the road is undulating, the wheel support which has been running straight would rotate in a horizontal plane when the wheel reaches the undulations causing the same problem.

On the other hand, in the cart described in the Japanese JIKKAIHEI 1-175472, the cart can not change direction at will as the wheel support connected rotatively to the wheel is fixed to the cart bottom.

Therefore, it is less possible that the cart deviates from the course so long as it is running through a straight section, but when the respective cart is drawn along a curved course, both front and rear wheels tend to rotate in a fixed vertical plane even after reaching at a curved section, and a horizontal strain will be applied to the wheel or the traction bar of respective cart so as to apply an excessive load to the respective members.

Additionally, as all front and rear wheels are restricted into the straight direction, it is extremely difficult to pass through a section having a small radius of curvature.

The present invention intends to solve such problems of the prior art and the first object of the present invention is to provide a device for preventing cart oscillation, wherein the rotation in a horizontal plane of the rear wheel side is restricted by an oscillation controlling member, without improving a cart having wheels connected to a wheel support which is rotative in a horizontal plane.

The second object is to provide a device for preventing cart oscillation wherein the direction change of the rear wheel side is controlled by a detachable oscillation controlling member having a coupler section for permitting the cart to follow a predetermined course, when a plurality of coupled carts are drawn.

SUMMARY OF THE INVENTION

To attain the objects, device for preventing a cart oscillation according to the invention is a device for preventing oscillation of the cart which has bottom front and rear wheels connected to a wheel support which is rotative in a horizontal plane, and is characterized in that it is equipped with an oscillation control member detachably fixed to the cart for controlling the rotation of the rear wheel in a horizontal plane by engaging with the rear wheel.

Therefore, according to the device, the cart oscillation may be easily controlled by attaching the detachable oscillation control member to the cart having wheels connected to by the wheel support which is rotative in a horizontal plane.

Moreover, according to the device, without improving the structure of the existing cart having the wheel support which is rotative in a horizontal plane, the oscillation control member may be attached only to carts necessary for the traction, and as this oscillation control member may be detachably fixed to the cart of similar structure, it is possible to prepare as many oscillation control members as necessary for the desired cart traction and to reuse them.

In an embodiment of the present invention, the rear wheels supported between a pair of side plates which are rotative in a horizontal plane are provided on the bottom of the cart. The oscillation control member has a member body for detachably attaching to the cart and an engagement groove formed in the member body so as to control the rotation of the rear wheel in the horizontal plane by engaging the side plates with the engagement groove.

Therefore, according to the device, as the rear wheel is supported between the pair of side plates and the side plates are engaged by the engagement groove formed in the member body of the oscillation control member detachably fixed to the cart, the rotation of the rear wheel in the horizontal plane may be controlled surely.

In another embodiment of the present invention, a coupler section is disposed on the oscillation control member to be attached to the rear side of the cart. On the other hand, a coupling device which may be coupled to the coupler section is attached to the running direction side of the cart and the coupling of the coupler section and the coupling device makes the traction of said plurality of carts possible.

In this case, a plurality of carts may be coupled and drawn by the coupler section and the coupling device and the rotation of the rear wheel in the horizontal plane is controlled by the oscillation control member so as to prevent the deviation from the running course due to the cart oscillation.

Now the embodiments of the present invention will be described referring to the drawings.

In the drawing, the reference number 1 corresponds to the device for preventing oscillation, 11 member body, 12a and 12b engagement grooves, 18b coupler shaft (coupler section), 2 cart, 25 front wheel and 26 rear wheel.

Moreover, 28a and 28b indicate side plates, 3 coupling device, 4 unattended transporter, A straight course and B curved course.

THE PREFERRED EMBODIMENT OF THE INVENTION

Figure 1:
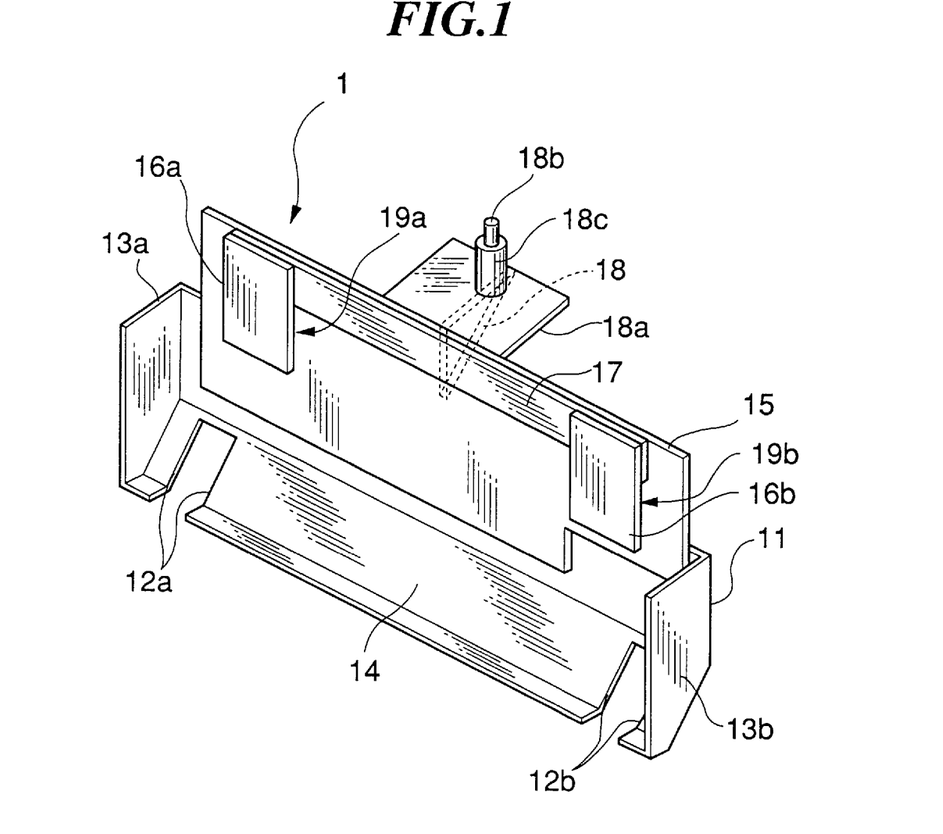
FIG. 1 is a perspective view showing the physical aspect of a device for preventing cart oscillation according to the Examples of the present invention.

Referring to FIG. 1, a device for preventing cart oscillation includes an oscillation control member and the oscillation control member is provided with a member body 11 and a pair of engagement grooves 12a, 12b formed in the member body 11.

Both ends of the member body 11 are folded substantially at right angles so as to form side sections 13a, 13b respectively.

The lower part of the body member 11 is folded slantwise and this slant portion of the member body 11 forms a slant section 14.

A pair of engagement grooves 12a, 12b are formed at both ends of this slant section 14.

On the other hand, to the upper part of the member body 11, one end of a support plate 15 is fixed by welding, bolt, screw or other well-known fixing means.

The other end of the support plate 15 is protruding upward from the member body 11.

On the other hand, at the upper end of the support plate 15, one surface of a spacer 17 is adhered horizontally and to the other surface of this spacer 17, a pair of fixing plates 16a, 16b are adhered.

To be more specific, a gap is formed substantially in parallel between the support plate 15 and the fixing plates 16a, 16b with a predetermined interval corresponding to the thickness of the spacer 17, this gap portion composing engagement sections 19a, 19b.

A bracket 18 is adhered to the surface in opposition to the side on which the spacer 17 of the support plate 15 is disposed and the upper part of this bracket 18 comprises an upper plate 18a in the horizontal direction.

A coupler shaft 18b composing a coupler section upward is disposed on the upper plate 18a while the lower end of this coupler shaft 18b is adhered to the upper plate 18a.

And an elastic member 18c is fitted over the coupler shaft 18b.

Figure 2:
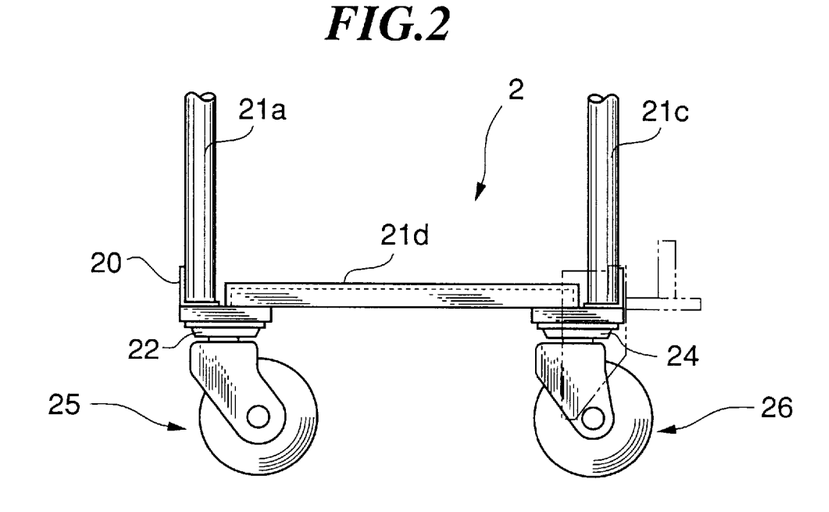
FIG. 2 is a side view showing the physical aspect of the cart.
Figure 3:
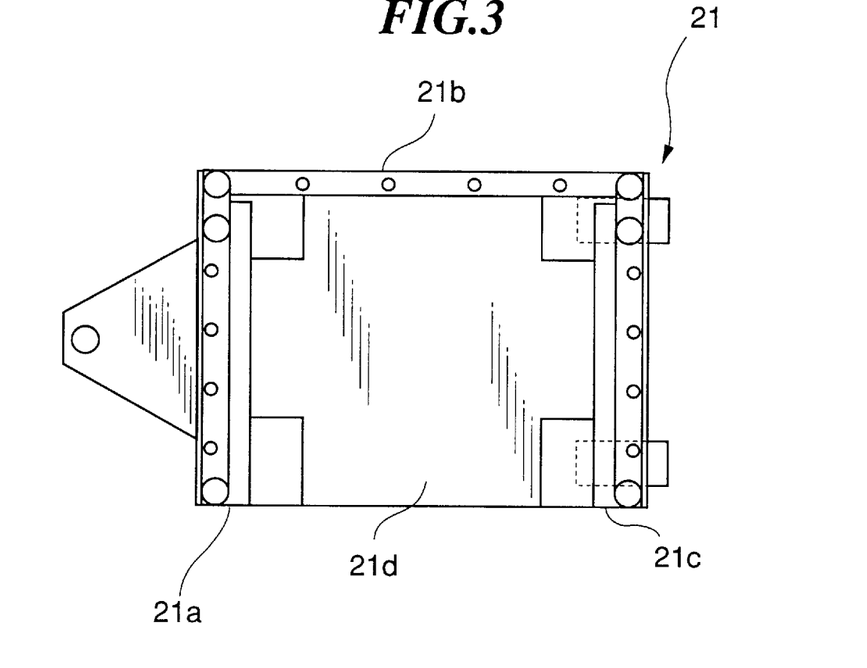
FIG. 3 is a plane view showing the physical aspect of the cart.

Referring to FIG. 2 or FIG. 3, a cart 2 includes a supporting frame 21 composed of a front frame 21a, a side frame 21b and a rear frame 21c.

Respective frames are linked by hinges keeping normally substantially right angles to each other as shown in FIG. 3.

A pair of bearings 22 are disposed at the both bottom ends of the front frame 21a and a pair of bearings 24 are also disposed at the both bottom ends of the rear frame 21c.

A wheel support member 27 rotative in a horizontal plane is disposed at the respective bearings 22, 24. Via this wheel support member 27, a pair of front wheels 25 and a pair of rear wheels 26 are respectively disposed rotatively on their axis in a vertical plane and rotatively in a horizontal plane.

The surrounding of the respective wheel has essentially a similar composition and, therefore, the following description will be made referring to one rear wheel 26.

Figure 4:
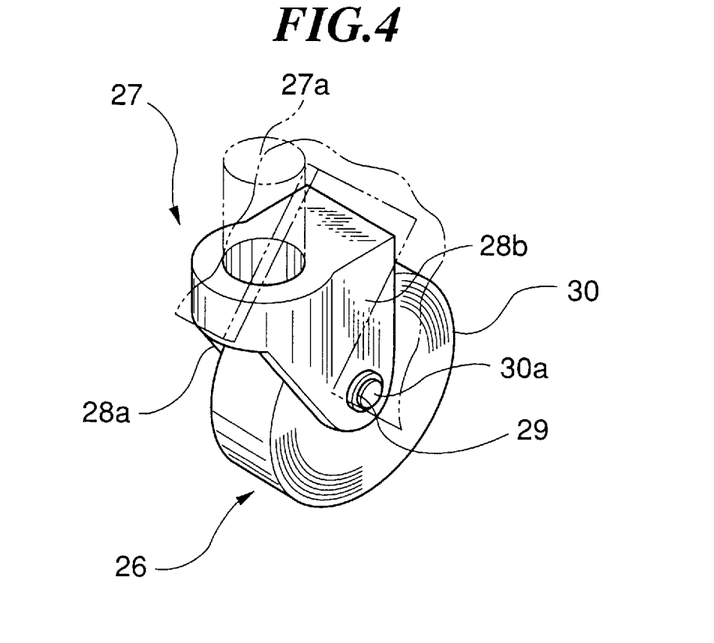
FIG. 4 is a schematic perspective view showing the physical aspect of a wheel of the cart and a wheel support carrying the same.

As shown in FIG. 4, a shaft 27a of the wheel support member 27 is inserted vertically into the bearing 24 so the wheel support member 27 rotates changing the direction freely in a horizontal plane in respect to the rear frame 21c.

The wheel support member 27 branches downward into a pair of side plates 28a, 28b respectively.

An insert hole 29 is formed respectively at the lower end of side plates 28a, 28b and the both ends of a rotation shaft 30a of a wheel 30 disposed between the pair of side plates 28a, 28b are inserted in this insert hole 29 rotatively.

Figure 5:
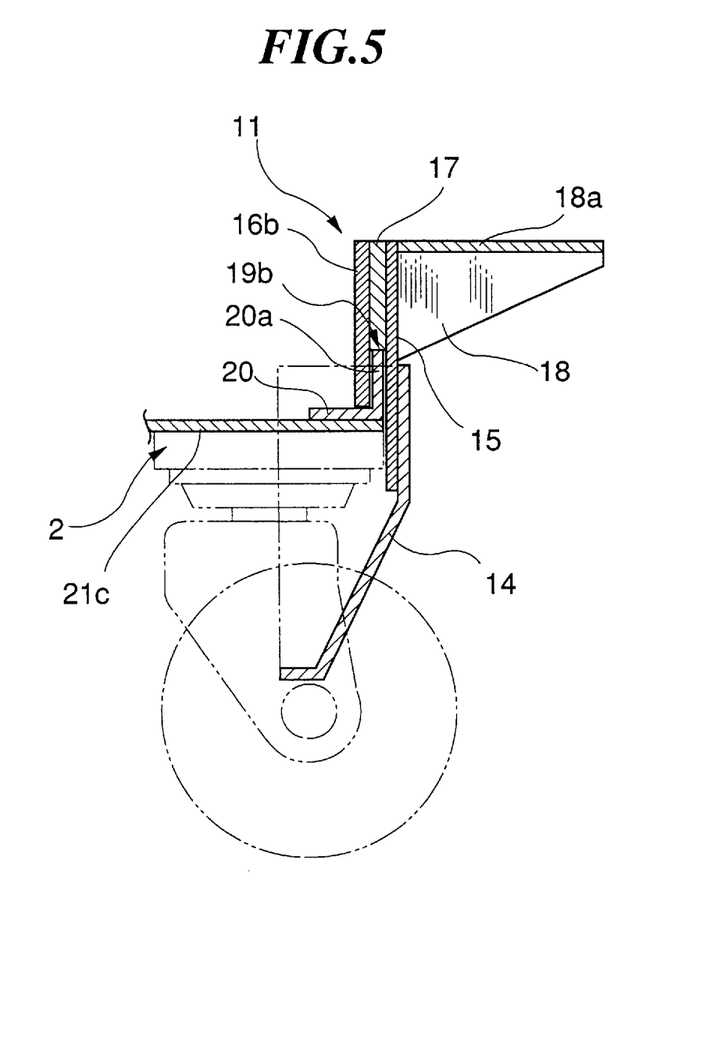
FIG. 5 is a schematic cross section showing the state of the oscillation control member attached to the cart.

An angle 20 is disposed along the longitudinal direction of the front frame 21a and the rear frame 21c and the engagement section 20a protruding upward from the angle 20 engages, as shown in FIG. 5, with the engagement portion 19b disposed on the member body 11 so as to detachably fix the member body 11 to the cart 2.

Now, a pair of engagement grooves 12a, 12b formed in the member body 11 engage with the side plates 28a, 28b respectively formed on a pair of rear wheels 26 so as to control the direction change (rotation in a horizontal plane) of the pair of rear wheels 26 and to allow only the rotation toward the straight direction (rotation around its own axis of the rear wheel in a vertical plane).

Again referring to FIG. 2 and FIG. 3, a bottom plate 21d is disposed at the top of the front frame 21a, the side frame 21b and the rear frame 21c.

As this bottom plate 21d is linked to the side frame 21b by hinges, the entire cart 2 may be folded substantially in L viewed from upward by folding the bottom plate 21d toward the side frame 21b rotating upward and, then, by folding the rear frame 21c toward the side frame 21b.

More concretely, the cart 2 may be arranged in a compact substantially L form by folding the bottom plate 21d rotating it upward and by folding the rear frame 21c linked to one end of the side frame 21b by hinges toward the side frame 21b so as to hold the folded bottom plate 21d between them.

A plurality of stays are disposed vertically on the front frame 21a, the side frame 21b and the rear frame 21c keeping a certain distance and a plurality of frames are disposed horizontally with a certain distance all the way crossing these stays.

Therefore, three sides of the bottom plate 21d are surrounded by a lattice composed of stays and frames and an opening is formed at the side in opposition to the side frame 21b and articles may be loaded on the bottom plate 21d through this opening.

Figure 6:
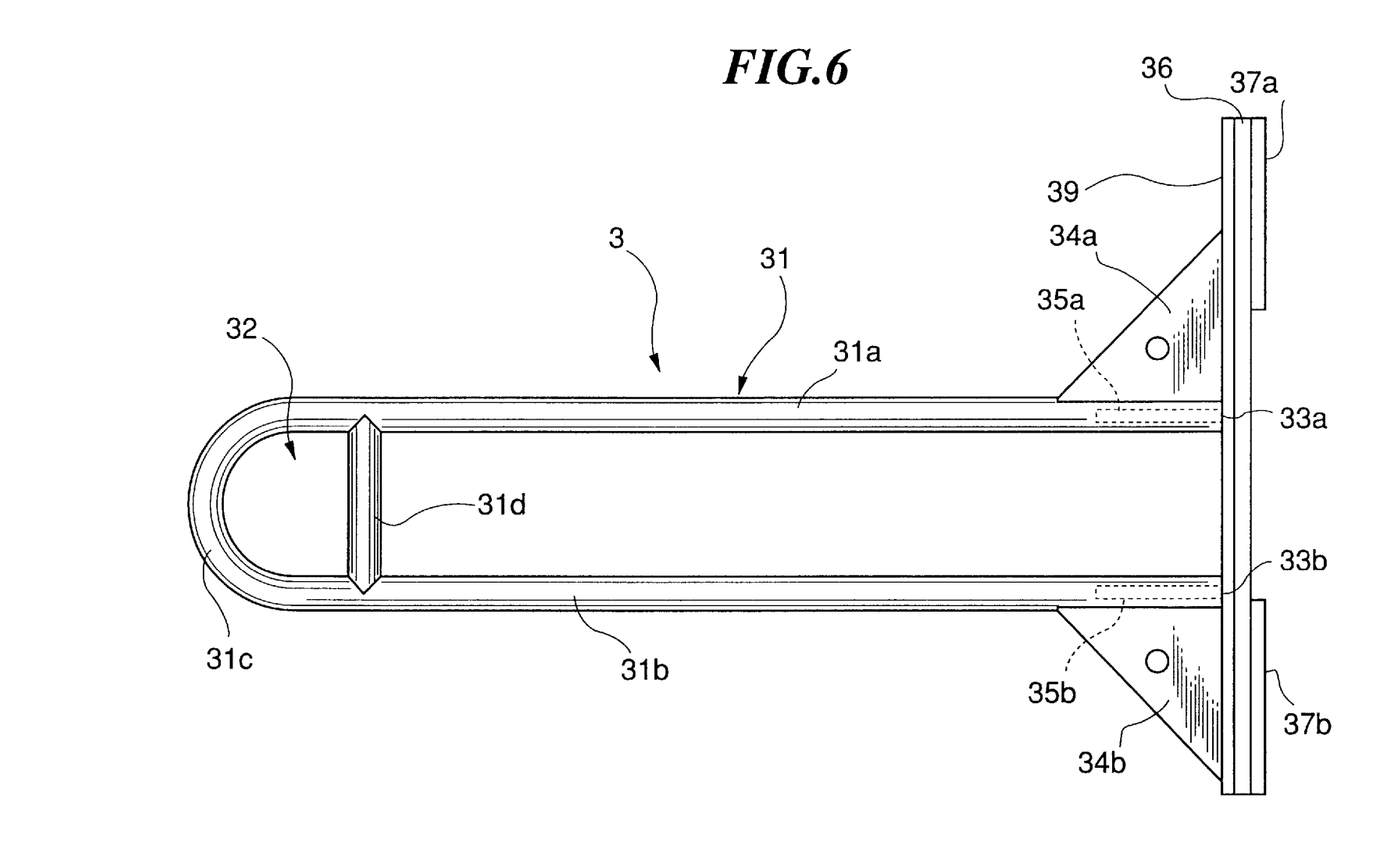
FIG. 6 is a schematic top view showing the physical aspect of a coupler section disposed on the oscillation control member and a coupling device to be coupled.

As shown in FIG. 6, the coupling device 3 is provided with a coupling member 31 comprising parallel sections 31a, 31b, a curved section 31c continuous to the parallel sections 31a and 31b, and a fixing shaft 31d connecting the parallel section 31a and the parallel section 31b.

A coupling hole 32 is formed surrounded by the curved section 31c and the fixing shaft 31d and, the coupling shaft 18b and the elastic member 18c of the device for preventing oscillation 1 are inserted into this coupling hole 32.

Here, the coupling hole 32 is dimensioned to be larger than the outer diameter of the elastic member 18c. As a gap is formed between them, the impact of sudden start or sudden stop may be absorbed with the elastic member 18c when the cart 2 is drawn by coupling the coupling device 3 and the coupling shaft 18b.

Taking this point into consideration, the elastic member 18c is preferably composed of rubber.

The ends 33a, 33b of the coupling member 31 are adhered to a support plate 39 and the coupling member 31 is disposed in a way to protrude from the support plate 39.

The parallel sections 31a, 31b of the coupling member 31 are linked to the support plate 39 respectively in the horizontal direction by means of brackets 34a, 34b and linked to the support plate 39 in the vertical direction too by means of brackets 35a, 35b respectively.

A pair of fixing plates 37a, 37b are adhered through a spacer 36 to the both ends of a face opposed to the side where the coupling member 31 of the support plate 39 is disposed.

Figure 7:
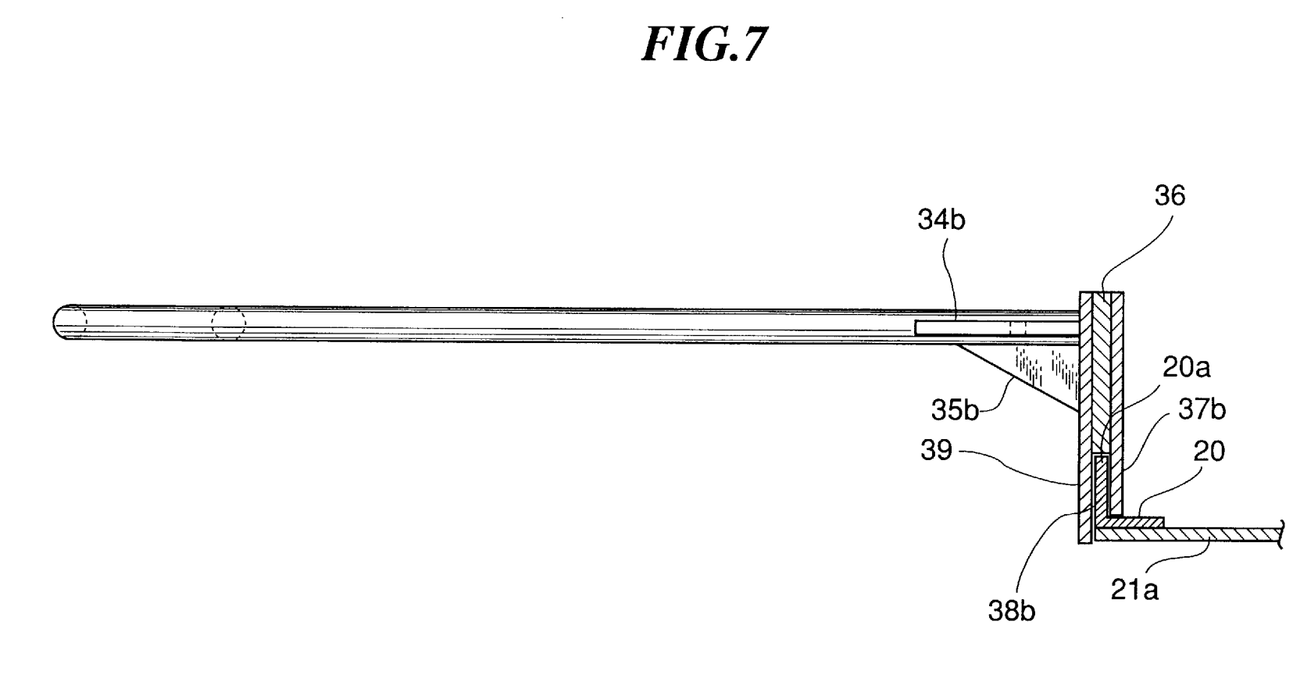
FIG. 7 is a schematic cross section showing the state of the coupling device attached to the cart.

Therefore, as shown in FIG. 7, a gap is formed substantially in parallel between the support plate 39 and the fixing plates 37a, 37b with a predetermined interval corresponding to the thickness of the spacer 36, and the engagement sections 38a, 38b are formed by this gap portion.

An angle 20 is disposed along the longitudinal direction on the front frame 21a, an engagement section 20a protruding upward from this angle 20 engages with engagement sections 38a, 38b formed between the support plate 39 and the fixing plates 37a, 37b so as to allow to attach the coupling device 3 detachably to the front frame 21a of the cart 2.

Now the operation method and the function of the device for preventing cart oscillation according to the Examples of the present invention described hereinabove will be described.

Figure 8:
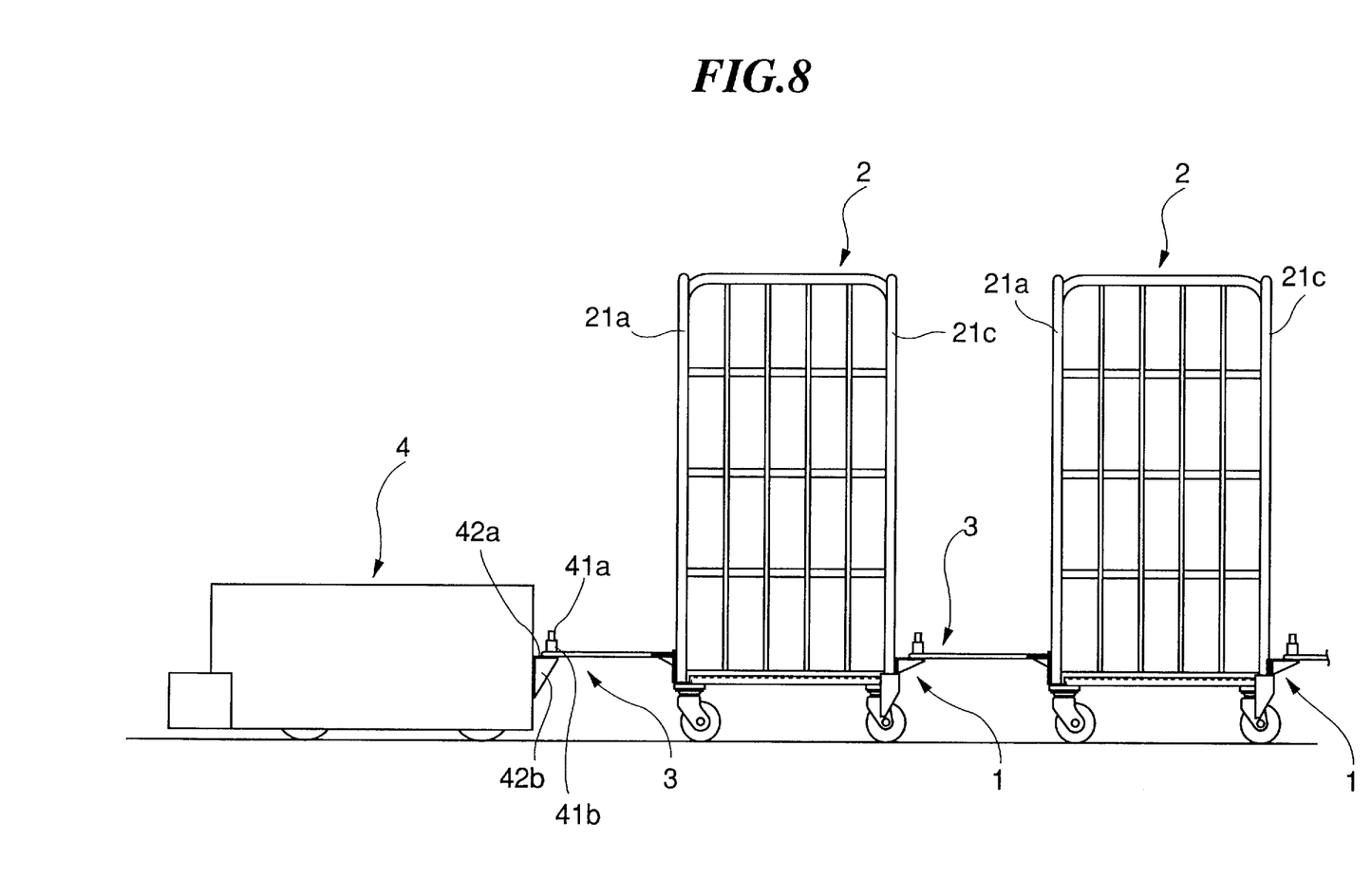
FIG. 8 is a side view showing the state of a plurality of carts coupled to an unattended transporter.

Referring to FIG. 8, first of all, the coupling device 3 is fitted to the front frame 21a of the respective cart 2 by engaging the engagement section 20a with the engagement sections 38a, 38b.

The device for preventing oscillation 1 is also fitted to the rear frame 21c by engaging the engagement section 20a with the engagement sections 19a, 19b.

At this time, the coupler shaft 18b of the coupler section disposed on the device for preventing oscillation 1 is inserted into the coupling hole 32 of the coupling device 3 so as to couple respective carts 2 each other.

Then, the coupling device 3 of the leading cart 2 is coupled with the coupler shaft 41a disposed on a tractor such as an unattended transporter 4.

As in the coupler shaft 18b, an elastic member 41b is fitted over this coupler shaft 41a, having the same structure as the coupler shaft 18b of the device for preventing oscillation 1.

Here, the coupler shaft 41a and the elastic member 41b are disposed on the rear face of the unattended transporter 4 by means of a bracket 42b having an upper plate 42a as is the case with the device for preventing oscillation 1.

Figure 9:
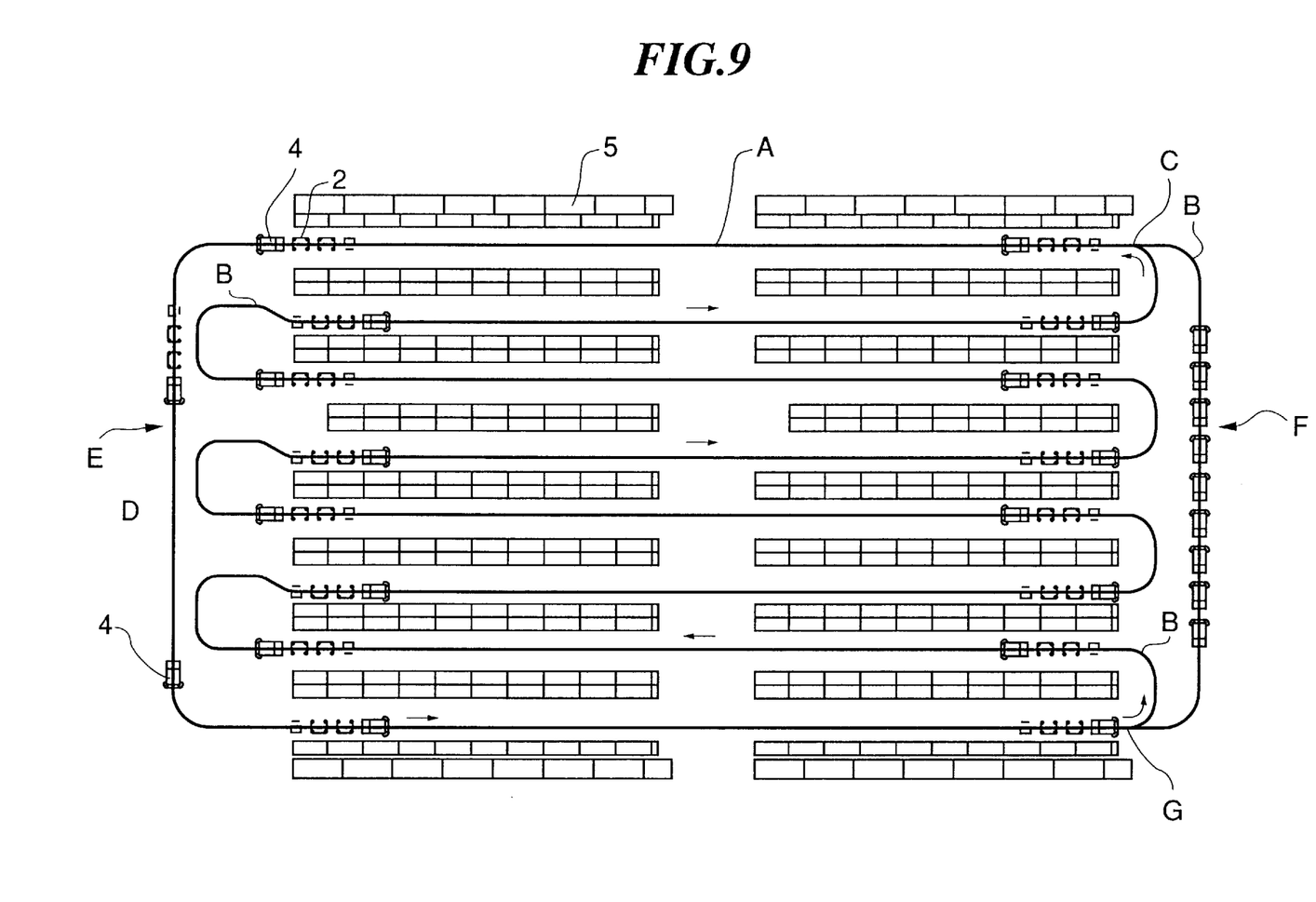
FIG. 9 is a plane view showing a running course of the unattended transporter coupled with the plurality of carts.

Now, they may run through a course composed of a plurality of straight course A, curved course B, junction C and branching point G as shown in FIG. 9.

First, a cart 2 is coupled with an unattended transporter 4 in a cart yard D where a plurality of empty carts 2 are ready.

The unattended transporter 4 starts running following, for instance, a magnetic guide tape adhered in advance to the road detected, for example, by a magnetic sensor disposed on its front.

An operator loads articles from each rack 5 onto the cart 2 while it is running toward the direction shown by an arrow in the drawing passing through straight courses A, curved courses B and others.

The side plates 28a, 28b of a pair of rear wheels 26 of the cart 2 are engaged by the engagement grooves 12a, 12b of the device for preventing oscillation 1 and the direction change of the pair of rear wheels 26 is controlled.

On the other hand, a pair of front wheels 25, that may freely change the direction respectively, tend to keep the straight running state even if the unattended transporter 4 enter a curved course B.

However, the direction of the pair of front wheels 25 is changed so as to follow the unattended transporter 4, because the coupling member 31 of the leading cart 2 is attracted toward the running direction of the unattended transporter 4 through the coupler shaft 41a of the unattended transporter 4.

Here, as the pair of rear wheels 26 is controlled to the forward direction, they follow the front wheels 25 allowing the cart 2 to run following the running direction of the unattended transporter 4.

The unattended transporter 4 drawing the cart 2 charged with articles detects a stop signal registered by a magnetic tape on the road and stops at a detaching station E.

Then the cart 2 is uncoupled from the unattended transporter 4 at the detaching station E, the device for preventing oscillation 1 and the coupling device 3 are uncoupled from the cart 2 and only the cart 2 will be transported by a truck or others to deliver to the destination.

At the destination, it will be used as an ordinary orientatable cart.

The uncoupled device for preventing oscillation 1 and coupling device 3 are loaded on the unattended transporter 4 and transported to the cart yard D.

Then, they will be fitted again to an empty cart 2 at the cart yard D to be recycled as described hereinabove.

At the end of the work of a day, the unattended transporter 4 separated from the cart 2 starts running alone, passes through the branching point G and is guided to a battery charging station F.

Then, it is charged within a predetermined period of time and then sent to the junction C one by one from the battery charging station F.

What I claim is:

1. A device for preventing oscillation of a cart having a bottom including front and rear wheels operatively connected to wheel supports rotative in a horizontal plane, said device comprising:

a control means for controlling direction change of the rear wheels which is engageable with the rear wheel supports;

a pair of side plates connected to said control means which are rotative in a horizontal plane;

an oscillation control member having a member body for detachably fixing to the cart, said member body having engagement grooves for controlling the direction change of the cart rear wheels by engaging said side plates with said engagement grooves; and a coupler section for coupling said oscillation control member with another cart.

2. The device for preventing oscillation of the cart according to claim 1, wherein an upper plate is attached to a rear side of said member body of said oscillation control member, a coupler shaft is disposed upward on the upper plate and, an elastic member is fitted over the coupler shaft.

3. The device for preventing oscillation of the cart according to claim 1, wherein a coupler section is provided on said member body of the oscillation control member and said coupler section is adapted to be coupled with a coupling device detachably fixed to a running direction side of another cart.

4. The device for preventing oscillation of the cart according to claim 1, wherein said control means is a structure comprising a top plate connected to said pair of side plates and a shaft connected to said top plate.

5. The device for preventing oscillation of the cart according to claim 1, wherein said member body includes a support plate connected to a lower body plate, said lower body plate having a first section connected to and parallel with said support plate and a slanted section which slants from said first section and includes said engagement grooves.

6. The device for preventing oscillation of the cart according to claim 5, wherein said support plate is connected to a spacer plate which is connected to a fixing plate, wherein the fixing plate extends from the spacer plate to form an engagement section for engaging a cart.

\* \* \* \* \*